Aug. 31, 1965
R. E. DAETWYLER
3,203,527
AIRCRAFT CARGO HANDLING SYSTEM
Filed Oct. 26, 1962
3 Sheets-Sheet 1
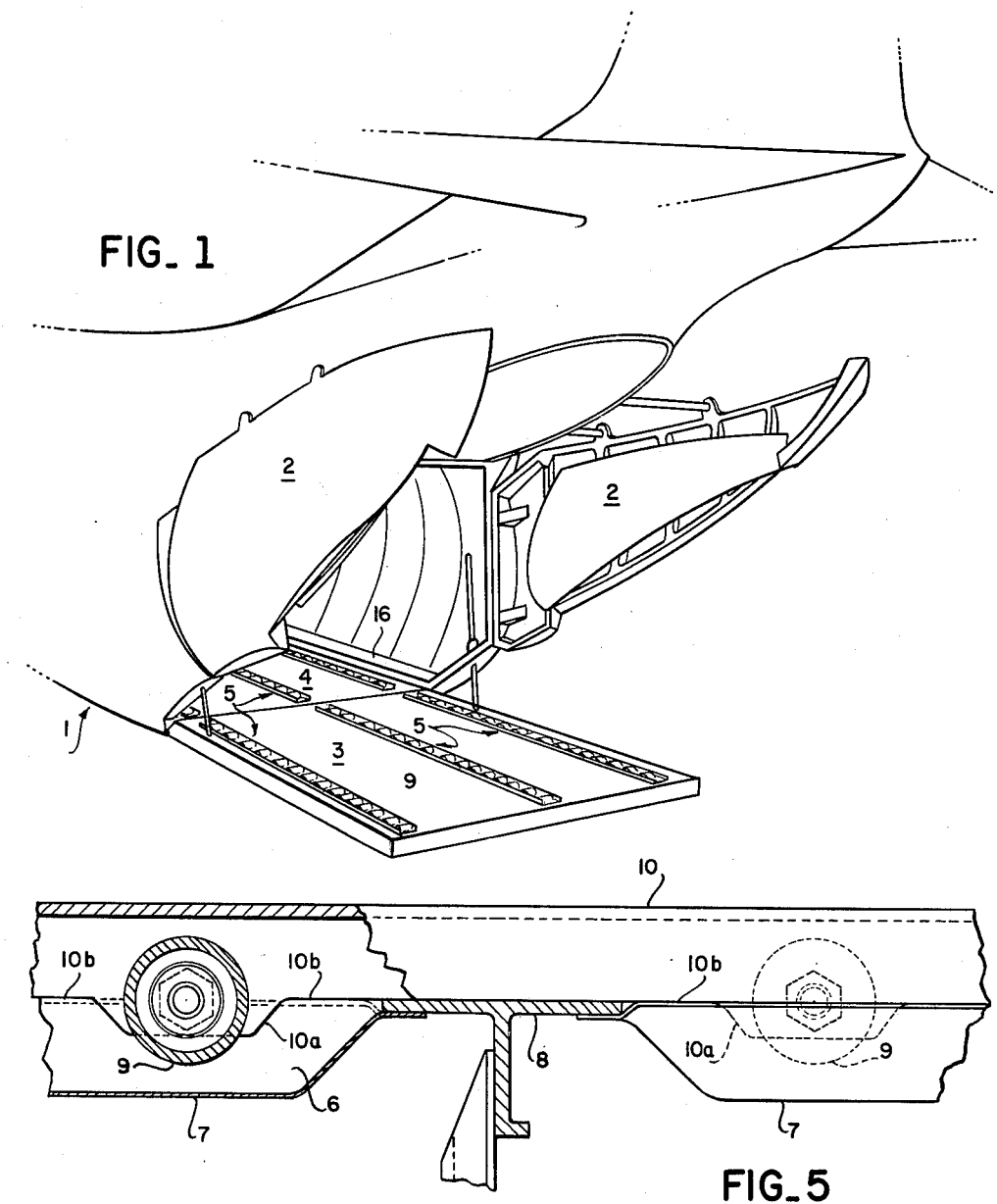
*INVENTOR.*
RICHARD E. DAETWYLER
BY
*George C. Sullivan*
Agent

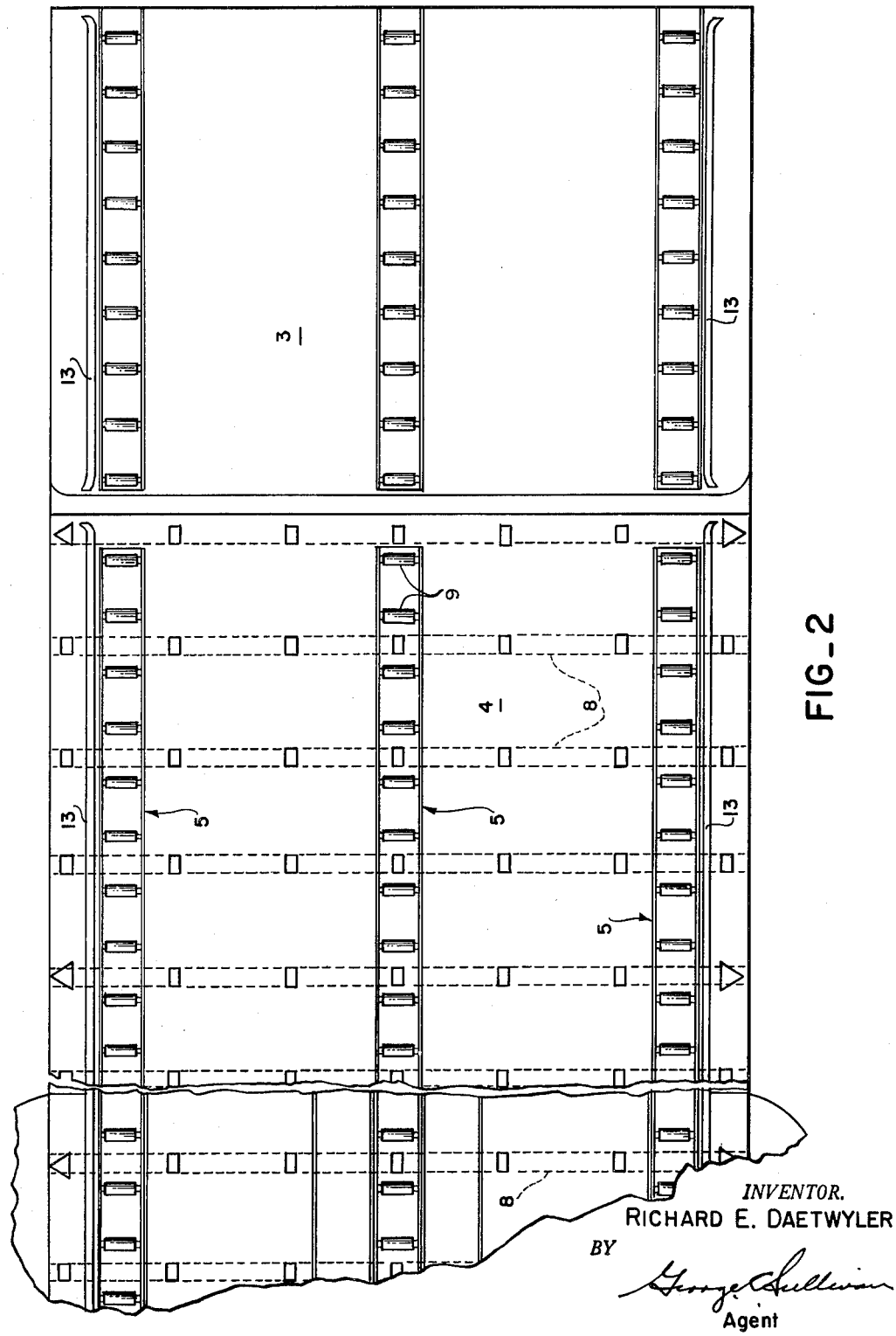

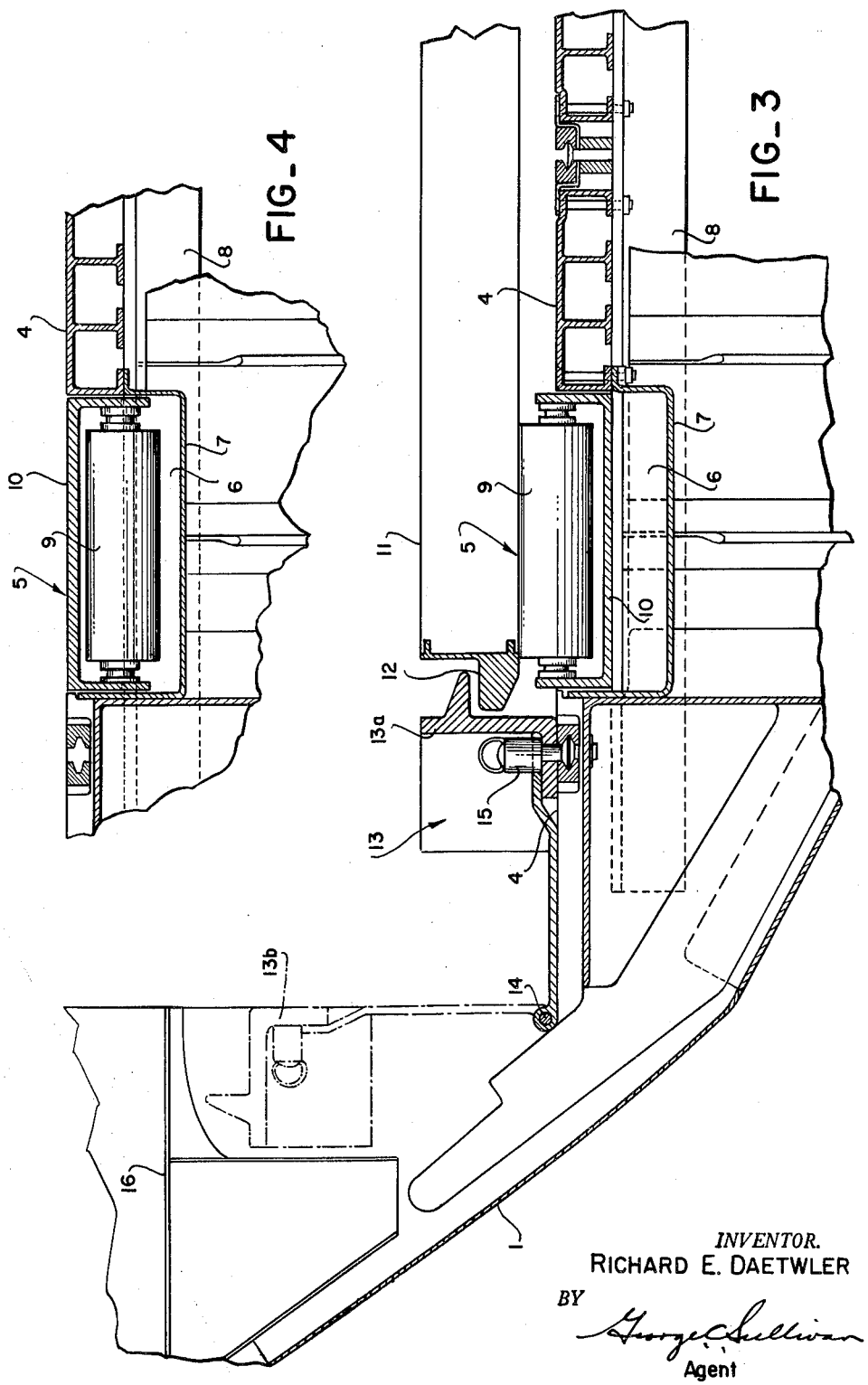

United States Patent Office 3,203,527
Patented Aug. 31, 1965

3,203,527
AIRCRAFT CARGO HANDLING SYSTEM
Richard E. Daetwyler, Marietta, Ga., assignor to Lockheed Aircraft Corporation, Burbank, Calif.
Filed Oct. 26, 1962, Ser. No. 233,405
3 Claims. (Cl. 193—35)

This invention relates to cargo handling systems in aircraft, and more particularly to a self contained system readily located within the aircraft in such a manner whereby the aircraft can be easily and speedily converted from a bulk loading floor arrangement to a palletized cargo handling system (utilizing roller conveyors and restraint rails) at any time or location with a minimum of down time.

Present day systems involving roller conveyors and restraint rail cargo handling systems within an aircraft require a substantial amount of conversion time to install the rollers and rails for conversion from a bulk loading floor to a palletized cargo handling system, as well as a substantial amount of tools and man power required for such installation. Likewise, upon conversion back to a bulk loading floor arrangement, the rollers and rails must be removed and either stored in the aircraft or some arrangements made for storing at the base or location upon which the equipment is removed. In the latter situation the only place the aircraft can be converted back to a palletized cargo handling system is at a base or location at which the roller and rail equipment is available.

An aircraft so equipped with this invention can be readily converted at any time and any place with minimum concern for storage space being required on the aircraft when a palletized cargo handling system is not desired or required. This feature is accomplished by making the system substantially self-contained as an integral part of the aircraft cargo hold in such a manner that the conversion from one system to another can be accomplished at any time and any place with a minimum of time and personnel involved.

Accordingly, it is an object of this invention to provide a self-contained and integral (and accordingly always available) cargo handling system in an aircraft.

A further object of this invention is to provide an aircraft with a cargo handling system convertible from a bulk loading floor to a palletized cargo handling system, or vice versa, with a minimum of time, man power and tools.

A still further object of this invention is to provide an aircraft with a convertible cargo system that is light weight and yet simple to convert from one type of system to another with minimum concern for storage or packing space within the aircraft.

It is a still further object of this invention to provide a self-contained cargo handling system in an aircraft of few parts, with relatively easy and inexpensive maintenance thereof.

Further objects and advantages will become apparent from the following description taken in connection with the accompanying drawings in which:

FIGURE 1 is a perspective view of the aft opening of a cargo aircraft showing some of the roller sections forming a part of this invention in operative position;

FIGURE 2 is a partial diagrammatic plan view of an aircraft cargo hold floor layout incorporating this invention;

FIGURE 3 is a partial cross-sectional view showing one of the roller sections of this invention in operative position along with the siderail feature of this invention in operative position in solid line, and the stowage position in phantom line;

FIGURE 4 is a partial cross-sectional view showing the roller section of FIGURE 3 in an inoperative position; and FIGURE 5 is a partial cross-sectional view in a plane longitudinal of one of the roller sections showing the support details thereof.

Generally stated, the invention comprises an aircraft contained palletized cargo loading system consisting of roller ways on the floor of the cargo compartment and siderails for restraining the side edges of the cargo pallets, the roller ways arranged in sections whereby they may be turned over to present a flush floorway in the cargo hold for a bulk loading floor arrangement and the siderails are pivotally connected to sides of the aircraft fuselage underneath interior walkways so that upon release from the floor they can be swung up into a stowed position underneath the walkways.

Referring more particularly to the drawings, there is shown in the figures the aft portion of a fuselage 1 of a cargo aircraft with a rear opening to the cargo compartment formed by a pair of doors 2 and a cargo ramp 3; the ramp 3 being arranged so that upon extension to the position shown in FIGURE 1, the floor of the ramp 3 will be parallel with the cargo floor 4 and the cargo compartment within the aircraft, or it can be further extended from the position shown in FIGURE 1 so as to serve as an incline ramp for loading or unloading of cargo directly from the ground.

A plurality of roller sections 5 are arranged to lie in channels 6 located in the cargo floor 4 which are formed by a series of pan members 7, each of which are located intermediate a pair of floor support structural members 8 which are a part of the fuselage structure. The roller sections 5 comprise a plurality of rollers 9 rotationally mounted in a U-channel 10, the depth of the sidewalls of the channel 10 being increased approximate the location of each roller 9 as indicated by the numeral 10a in FIGURE 5; the intermediate sidewall portions of the channels 10 being of a reduced dimension intermediate the portions or regions 10a, as indicated by the numeral 10b in FIGURE 5. When the roller sections 5 are located in the channels 6 with the rollers 9 facing upwardly as shown in FIGURE 3, the outer bottom surface of channel member 10 rests on the upper surface of the spaced floor support structural members 8, and with the overall dimension from the outer surface of channel member 10 and the opposite contact face of roller 9 being greater than the distance between the upper surface of floor support structural member 8 and the aircraft floor 4, the rollers 9 will project above the surface of cargo floor 4 as best seen in FIGURES 1, 2 and 3.

When the roller sections 5 are turned over to a position shown in FIGURES 4 and 5, the upper surface of the floor support structural members 8 contact the edges of the reduced sidewall portions 10b of channel member 10 with the larger sidewall portions 10a and rollers 9 nesting in pans 7 at a point below the level of the upper surface of floor support structural member 8, and in this manner making the outer flat surface of channel member 10 level with and parallel to the cargo floor 4 as can best be seen from FIGURES 4 and 5, and also schematically depicted in FIGURE 2.

In this manner, the roller sections are always located in the aircraft which can be easily converted from a bulk loading floor arrangement to a palletized cargo handling system, or vice versa, merely by flipping the roller sections 5 back and forth as desired, it being understood that any appropriate locking or retaining mechanisms for holding roller sections 5 in either position may be incorporated as desired.

For the palletized cargo handling system arrangement involving a pallet 11 having a siderail 12 (as best seen in FIGURE 3), a restraint rail 13 is pivotally mounted at 14 to the interior of the fuselage 1, the restraint rail 13 being movable about pivot 14 to be locked in a first position 13a as indicated in FIGURE 3 and locked to the cargo floor 4 by any appropriate locking device or mechanism 15, as well as restraint rail 13 can be swung in an upward direction around pivot 14 to nest in a position as indicated by 13b underneath walkway 16 located on the side of the aircraft as best seen in FIGURES 1 and 3. When the restraint rail 13 is in position 13b (as shown in FIGURE 3) under walkway 16, any appropriate locking or hooking means (not shown) can be used for keeping restraint rail 13 in the up position underneath walkway 16.

It is also be realized that side restraint rails 13 may be desired on the ramp 3, as shown schematically in FIGURE 2. However, in such a case where there is no walkway or other space for the restraint rail to be folded or moved into an out of the way space such as the ramp area shown in FIGURE 1, the restraint rail sections 13 may be arranged or adapted to be completely removed from the level of ramp 3 and stowed in any appropriate place in the aircraft, such as some place within the cargo compartment.

In operation, the cargo floor 4 in the cargo hold can be converted from a bulk loading floor configuration, such as when the roller sections are in the position shown in FIGURE 4 and the restraint rails 13 are in the position indicated by 13b in FIGURE 3, to a palletized cargo handling system configuration. This conversion is accomplished by reversing the roller sections 5 from the position shown in FIGURE 4 to the position shown in FIGURE 3, and the moving of the restraint rail from the position indicated by 13b to the position indicated by 13a in FIGURE 3, the locking devices 15 securing the restraint rails 13 to the cargo floor. Conversion from a palletized cargo handling system configuration to a bulk loading floor configuration is accomplished by a reversal of the aforementioned operation.

Thus it can be seen, through this invention there is provided a simple, rugged and flexible cargo handling system in an aircraft that is adaptable to both bulk and mechanized cargo handling systems capable of handling palletized cargoes. Likewise, it can also be seen that with such an arrangement provided by this invention, conversion from one type of cargo handling system to another within the aircraft can be accomplished at any time and at any place without the concern as to the availability of the parts required or the ability to stow the parts not required.

While a particular embodiment of the invention has been illustrated and described, it will be obvious to those skilled in the art that various changes and modifications may be made without departure from the invention and it is intended to cover in the appended claims all such modifications and equivalents as fall within the true spirit and scope of this invention.

What is claimed is:

1. A cargo handling system in combination with an aircraft cargo compartment having a floor comprising: a plurality of roller sections extending in a longitudinal direction in the cargo compartment floor and forming at least a pair of parallel roller tracks in the cargo floor, each roller section having a substantially flat elongate surface, said roller sections each having a plurality of rollers with effective roller surfaces extending outwardly from the side opposite said flat elongate surface and a first and second position relative to the floor in which movement from one position to the other is by inversion of the roller sections, said first position placing the effective roller surfaces at a point above the cargo floor, and said second position placing the effective roller surfaces below the cargo floor, said flat elongate surfaces of the roller sections forming a part of the aircraft cargo compartment floor surface when the roller sections are in said second position.

2. A cargo handling system in combination with an aircraft cargo compartment having a floor and a walkway along the floor on each side thereof comprising: a restraint rail means on each side of said floor extending in a longitudinal direction in the cargo compartment, said restraint rail means pivotally connected to said floor for movement between a first and second position, said first position placing said restraint rail means on the floor for limiting upward movement of cargo pallets located in the cargo compartment on the floor, and said second position placing said restraint rail means in a stowed position under the walkway.

3. A cargo handling system in combination with an aircraft cargo compartment as claimed in claim 2 including a plurality of roller sections extending in a longitudinal direction relative to the cargo compartment floor and forming at least a pair of parallel cargo floor roller tracks, said roller sections each having a plurality of rollers and a first and second position relative to the floor in which movement from one position to the other is by inversion of the roller sections, said first position placing the effective roller surfaces at a point above the cargo floor, and said second position placing the effective roller surfaces below the cargo floor, said roller sections in the second position forming a substantially flat cargo compartment floor surface.

References Cited by the Examiner

UNITED STATES PATENTS

| 699,021 | 4/02 | Scharrer. | |
|---|---|---|---|
| 2,468,925 | 5/49 | De Boer | 296—16 |
| 2,801,730 | 8/57 | Strickler | 198—204 |
| 2,973,073 | 2/61 | Elliott | 193—38 |

SAMUEL F. COLEMAN, *Primary Examiner.*

WILLIAM B. LA BORDE, ERNEST A. FALLER,
*Examiners.*